Sept. 3, 1957  P. PALIC  2,805,320
ELECTRIC WELDING APPARATUS
Filed Aug. 23, 1955  2 Sheets-Sheet 1

INVENTOR
PETAR PALIC
BY
AGENT

Sept. 3, 1957 P. PALIC 2,805,320
ELECTRIC WELDING APPARATUS
Filed Aug. 23, 1955 2 Sheets-Sheet 2

INVENTOR
PETAR PALIC
BY Fred M. Vogel
AGENT

United States Patent Office
2,805,320
Patented Sept. 3, 1957

2,805,320

ELECTRIC WELDING APPARATUS

Petar Palic, Hamburg, Germany, assignor, by mesne assignments, to North American Philips Company, Inc., New York, N. Y., a corporation of Delaware Application August 23, 1955, Serial No. 530,110

10 Claims. (Cl. 219—108)

The present invention relates to electric welding apparatus.

In electric resistance welding the welding time is fixed as a rule by experiment. If the welding time is too short, the welding area is heated insufficiently and the material becomes hardly liquid. If the welding time is too long, the welding area is burnt, so that the piece of work may be damaged.

The tolerance in a welding time is different for different materials to be welded, so that the adjustment of the welding apparatus is rendered difficult. Hitherto the welding time and the welding-current strength were chosen experimentally for each individual case. This choice was, of course, dependent upon the experience of the operator and even the greatest experience was insufficient if the material had irregularities, for example cracks due to rolling, occlusions or the like occurring in the material, or if the chemical composition of the alloys to be welded deviated from the required values, for example due to irregular manufacture. In accordance with the invention these difficulties are avoided. This is based on the recognition of the fact that during the welding operation physical variations occur at the welding area and can be utilized for the control of the welding operation. If, for example, two plates are to be welded together, these plates are initially separated by a slot, which disappears as soon as the welding current renders the material of the plates liquid at the welding area. If it is possible to indicate the disappearance of this slot, an indication is obtained that the welding current can be switched out.

The invention relates to electric welding apparatus, more particularly, resistance welding apparatus. In accordance with the invention, a transmitter and a receiver for sonic or ultrasonic oscillations are arranged near the welding area in a manner such that the work piece is traversed by the sonic oscillations and at the output of the receiver the provision is made of means reacting upon a variation of the oscillation resistance and enabling the control of the welding operation, more particularly, the manual switching-on or switching-off of the welding current. It is known that metals are good conductors for sonic and ultrasonic oscillations and it is also known that interruptions of the work piece extending transversely to the oscillation direction produce an important increase in the said resistance. In accordance with the invention this fact is utilized to obtain an indication of the time when the slot between the parts of the work piece disappears during welding, so that the welding current can then be switched on or off automatically or manually.

In principle, the oscillations can be introduced with the aid of a magnetostrictive or an electrostrictive oscillatory device directly at the side of the welding electrode into the work pieces and conducted away therefrom in a manner such that the oscillations in the work piece cross the path of the welding current. However, the oscillations are introduced and conducted away preferably via the welding electrode. This can be carried out without the need for further means and it is thus ensured that the welding area is embraced by the radiation. Moreover, difficulties which are likely to occur due to the development of heat during the welding operation in the oscillatory device at the side of the electrode are avoided. In order to obtain optimum variations in the resistance and in order to render the indication or the control as sharp as possible, the welding electrode employed must be shaped in a form such that deflections of the oscillations in its interior are avoided as far as possible, the form being such that, especially if the diameter is comparatively large, no important abrupt variations of the cross section in the direction of propagation of the oscillations occur.

The device according to the invention may serve, moreover, to switch on the welding current, when the welding electrode is pressed against the work piece, when this pressure has attained a sufficient value. It is a matter of fact that irregular welding areas must occur, particularly with spot welding, if the aforesaid condition is not sufficiently taken into account. If the pressure is too small, the heating due to the welding current may concentrate initially on the outer surface of the work piece, so that the material may be brunt at this area before the welding operation proper has started. It is therefore advisable to construct the device according to the invention in a manner such that the means provided at the output of the receiver switch on the welding current, when the welding electrode is pressed against the work piece, as soon as a pressure of the electrode(s) on the work piece varying with a variation in resistance is sufficient for the welding current.

The device according to the invention may be constructed efficiently in a manner such that the work piece is traversed by sinusoidally modulated, ultrasonic oscillations, the oscillations captured at the receiver end, subsequent to suitable amplification, being demodulated and supplied to a second device, of which the output voltage, when exceeding a threshold value, switches on the welding current, and switches it off when a limit value is attained. Provision may in this case be made of a signalling device, for example a signalling lamp, controlled by the output voltage of the device, the operator switching on or off in accordance with the indications given. However, it is efficient to use a control of the welding current in which, for example by means of grid-controlled gas discharge tubes, the welding current is switched on or off immediately, since the output voltage of the device allows an automatic control of the welding current.

In principle, the work piece may be traversed by sonic or ultrasonic oscillations subsequent to reflection. In this case a welding electrode can be provided with a quartz vibrator or the like, which serves both for the emission and the reception of the oscillations. The oscillations emitted are reflected at the first slot between the welding electrode and the plate, at the slot between the two plates, where the welding operation is performed and finally at the slot between the second plate and the second welding electrode. The various reflected oscillations reach the receiver in succession, due to their different transit times, and are used further for controlling the welding operation. Consequently, on the basis of their different transit times, they can be distinguished from the reflected oscillations.

It is efficient in this case to supply the reflected oscillations at the receiver end to a control-device, which supplies, when a reflection pulse occurs at the welding area, a signal for switching on and, when this pulse disappears, a signal for switching off the welding current.

The control-device may be constituted by a counting circuit for the reflected pulses occurring during an uninterrupted pulse cycle, this circuit providing the required switching signals for the welding current, when apart from a pulse at the outer surface of the work piece and, as the case may be, a pulse at the rear side of the work piece, a pulse occurs at the welding area or disappears at this area. The counting circuit may be constituted by a square-wave voltage generator, the output voltage is raised by one step by each reflected pulse received per pulse cycle, irrespective of the amplitude thereof, and is reduced to the value zero at the termination of a pulse cycle. Use is made of the fact that in the conventional arrangement of the work pieces practically only three slots prevail between the welding electrodes so that, when the electrodes are sufficiently pressed, three distinct reflection pulses are produced, of which one disappears when during the welding operation the central slot disappears due to the liquifaction of the metal.

It is advantageous in this case to supply the reflected pulses to the square-wave voltage generator via an amplitude limiter, more particularly, an over-critical amplification stage.

The output voltage of the square-wave generator is supplied efficiently to a second device having a threshold value, which supplies a voltage for controlling the welding current when the square-wave voltage is attained which is the case at the occurrence of the welding area pulses.

It may finally be advantageous to construct the device according to the invention in a manner such that the output voltage of the last-mentioned second device is supplied to a monostable multivibrator, from which is obtained an output pulse with negative polarity, which is supplied to the control grid of a gas or vapor discharge tube, of which the unbiassed control electrode is connected to an accumulator, for example an RC network, this tube interrupting the welding current when it is ignited and allowing this current to pass, when the discharge is extinguished.

In order that the invention may be readily carried into effect, it will now be described with reference to the accompanying drawings, wherein.

Figure 1:
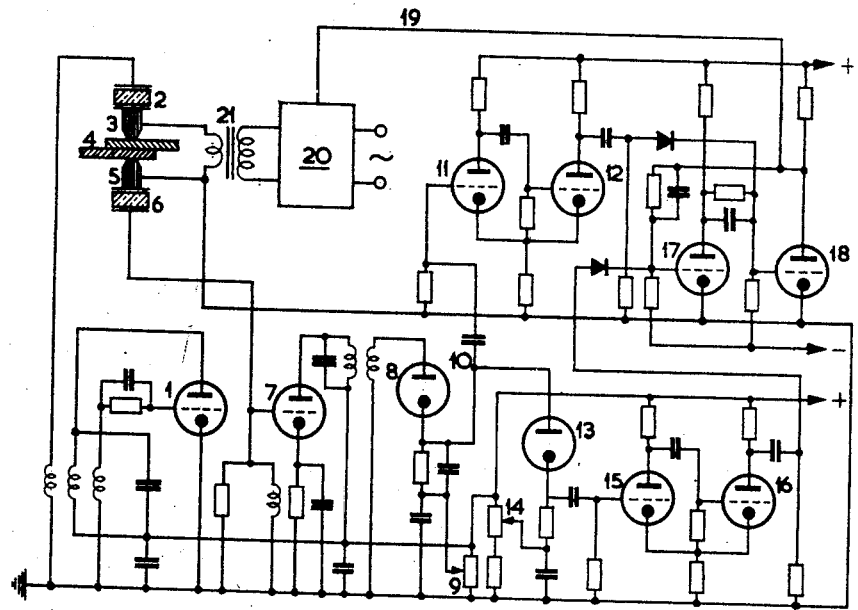
Fig. 1 is a schematic diagram of an embodiment of the apparatus of the present invention, the work piece being irradiated with constant amplitude.

In the automatic welding apparatus shown in Fig. 1 provision is made of a high-frequency generator comprising a tube 1, the output voltage of which is supplied to a quartz vibrator 2. The ultrasonic oscillations produced are supplied via a welding electrode 3 to a work piece 4 and reach, via a second welding electrode 5, a second quartz vibrator 6, where they are converted into electrical oscillations. These ultrasonic oscillations have a constant amplitude, since a modulation of the high-frequency oscillations produced in the generator does not take place. The amplitude of the voltage supplied by the quartz vibrator 6 varies to a great extent with the resistance to ultrasonic oscillations in the welding apparatus and hence with the slots in the path of the sound oscillations.

If the welding electrodes 3 and 5 are slowly pressed towards one another, the resistance of the work piece 4 to the ultrasonic oscillations is reduced. The ultrasonic sound amplitude in the quartz vibrator 6 increases proportionally therewith and hence the high-frequency voltage applied to the receiver increases likewise. This voltage is amplified in an electron tube 7 and rectified by means of a diode 8. The diode 8 has an adjustable bias voltage, which can be obtained from a potentiometer 9. The potentiometer 9 is adjusted in a manner such that the diode 8 can supply a directional voltage when the pressure of the welding electrodes 3 and 5 has reached the value required for a satisfactory welding. As soon as this occurs, the diode 8 supplies, via a coupling capacitor 10, a signal for a monostable trigger circuit comprising electron tubes 11 and 12.

During the welding operation the resistance of the work piece 4 to the sound oscillations decreases and when the material mixes by flowing at the welding area the resistance reaches the lowest value. Thus at the grid of the tube 7 a higher amplitude and also a higher control-voltage is produced, this voltage being operative in a diode 13. The second diode 13 obtains a still higher bias voltage than the diode 8 by means of a potentiometer 14. Consequently a higher control-voltage is required to pass a current through the diode 13. When the resistance of the welding area to the sound oscillations reaches the lowest value, a current passes through the diode 13 and a control-pulse is supplied to a second dependent trigger circuit comprising electron tubes 15 and 16, so that the trigger changes over.

The two dependent trigger circuits comprising the tubes 11 and 12, and 15 and 16 supply, when changing over, a voltage pulse for a third non-automatically changing-over circuit comprising electron tubes 17 and 18. The anode of the tube 18 is connected via a conductor 19 to an electronic switch 20, which serves to switch a welding transformer 21 on and off.

When in the manner described above the modulation voltage of the diode 8 reaches the trigger circuit 11, 12, the tube 12 supplies a pulse to the grid of the tube 18 and the trigger circuit 17, 18 changes over into that position in which a starting pulse reaches the switch 20 via the conductor 19. When a sufficient contact pressure is reached, the welding current is switched on in the manner described. When the metal at the welding area becomes liquid under the action of the welding current, the trigger circuit 17, 18 changes over into its initial position under the action of the pulse supplied by the diode 13 via the trigger circuit 15, 16. At the same time a further control-pulse reaches the electronic switch 20 via the conductor 19, so that the welding current is switched off.

In this device the adjusted bias voltage of the diodes 8 and 13 respectively plays an important part, since one bias voltage is a measure of the pressure of the electrodes, at which the welding current is switched on and the other bias voltage is to be chosen such that the switching off takes place only at sufficient heating of the work piece. The adjustment of the two potentiometers 9 and 14 depends in the first place on the thickness of the work piece 4 and the potentiometers can therefore be provided with an adjusting dial, by which a direct adjustment to the dimensions of the parts to be welded is allowed.

Figure 2:
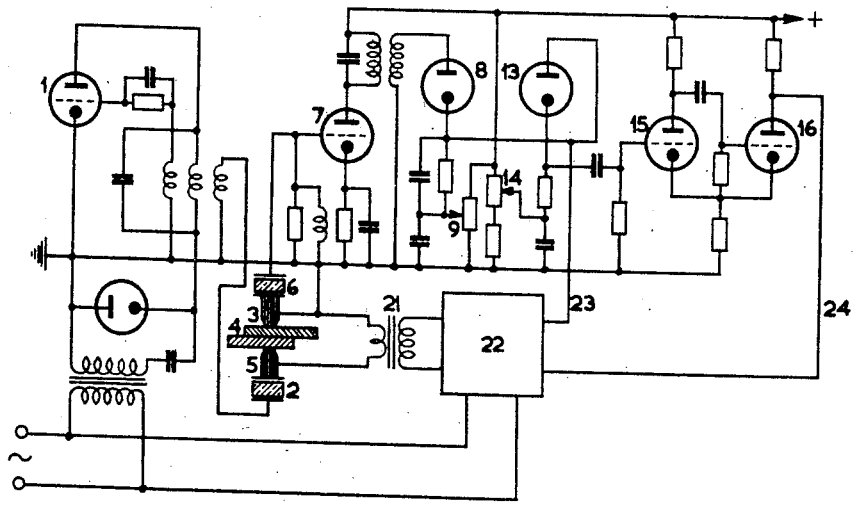
Fig. 2 is a schematic diagram of another embodiment of the apparatus of the present invention, in which the work piece is irradiated by a sinusoidally modulated, ultrasonic oscillation.

A further embodiment of the invention is shown in Fig. 2. The high-frequency generator 1 is, in this case, modulated by a voltage of 50 cycles per second, since the anode voltage oscillates invariably between zero and the maximum value in a sinusoidal manner. The quartz vibrators 2 and 6, the welding electrodes 3 and 5, the work piece 4 and the welding transformer 21 are arranged in the same manner shown in Fig. 1. Subsequent to sufficient amplification in the tube 7 the voltage of the receiving quartz vibrator 6 is supplied to the diode 8, which as in Fig. 1, obtains a bias voltage from the potentiometer 9. At a sufficient pressure the diode 8 supplies a substantially sinusoidal signal through a conductor 23 to a control-member 22 of the welding transformer 21, this member serving in a manner not shown as a connection of the welding transformer 21 to the alternating-current supply source. To this end use may, for example, be made of a choke driven in the working range and converting the 50 cycles per second oscillations into control-pulses for an electronic switch.

If the alternating voltage supplied by the diode 8 exceeds a particular value, the diode 13 also becomes conductive.

The response point of this diode is adjustable with the aid of the potentiometer 14 as in Fig. 1. A control-voltage then flows from the diode 13 to the control-member of a monostable trigger circuit comprising electron tubes 15 and 16, which supplies, in turn, a blocking pulse via a conductor 24 connected to the anode of the tube 16 to the control-member 22. This pulse has an effect such that the ignition pulses supplied by the diode 8 are suppressed and that the welding transformer 21 is switched off the A. C. supply source.

Figure 3:
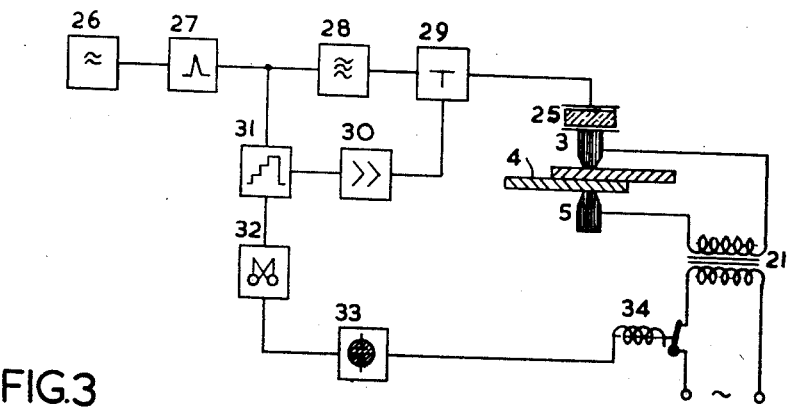
Fig. 3 is a schematic block diagram of still another embodiment of the apparatus of the present invention, in which the work piece is irradiated by reflected pulses.

An automatic welding apparatus controlled by ultrasonic reflection pulses is shown in Fig. 3 in a block diagram. In Fig. 3 the welding electrodes, the work piece and the welding transformer are designated by the same reference numerals as in Figs. 1 and 2. For switching the ultrasonic oscillations on and off, provision is made of only one quartz vibrator 25, which is connected to the control-member in a simultaneous arrangement.

An alternating-current generator 26, serving as a pulse producer, the frequency of which may be a few thousand cycles, feeds a pulse generator 27, which derives positive voltage pulses from the substantially sinusoidal voltage of the generator 26. Thus a high-frequency generator 28 is modulated and the high-frequency pulses produced by the generator 28 reach a quartz vibrator 25 via a change-over coil 29. Consequently, high-frequency sound pulses are supplied to the work piece 4 via the welding electrode 3, and the reflection pulses produced at the prevailing slots reach, via the quartz vibrator 25 and the change-over coil 29, a receiver 30, in which they are amplified and demodulated. The output voltages of the receiver are supplied to a square-wave voltage generator 31, which, at the reception of each reflection pulse, supplies an output voltage which is higher by a particular value until at the end of a pulse-producing period the square-wave voltage drops again to the value zero. To the output of the square-wave voltage generator is connected a monostable trigger circuit 32, which switches the welding transformer 21 on or off via a switching device 33, comprising a grid-controlled gas discharge tube. To this end a relay 34 (shown in Fig. 3) is provided; in practice, as a rule, the relay 34 is constructed in the form of an electronic switch, i. e. in the form of two anti-parallel connected, adjustable gas or vapor discharge paths.

During the operation of the system of Fig. 3 the pulse-controlled ultrasonic sound producer supplies a pulse to the receiver, this pulse being composed of various reflected pulses, which can be exactly distinguished according to the various slots separating the welding electrodes 3 and 5 and the work pieces 4 to be welded. When the welding current is switched on, the welding area is heated until the central slot is filled by the liquid metal. At this instant the reflection image varies, since the reflection pulses associated with this slot disappear. The disappearance of this pulse is converted into the switching-off signal for the welding current. Moreover, the welding current is switched on when the pressure of the welding electrodes has reached a sufficiently high value. Only then can the reflection pulse, corresponding to the slot between the parts of the work piece 4 to be welded, be properly produced. The occurrence of this pulse thus constitutes a criterion for switching on the welding current.

The pulse cycle frequency, i. e. the frequency of the A. C. generator 26 may, for example, be 5000 cycles per second. The working frequency of the ultrasonic sound transmitter may, for example, be 5 megacycles per second. For the structural connection of the quartz vibrator 25 to the welding electrode 3 the conventional technical measures for ultrasonic oscillations must be taken to ensure freedom from reflections and a favorable operation of the device. The shape of the welding electrode 3 is preferably chosen to be such that it has not only satisfactory properties in the welding field, but also a minimum of interfering ultrasonic additional reflections.

Figure 4:
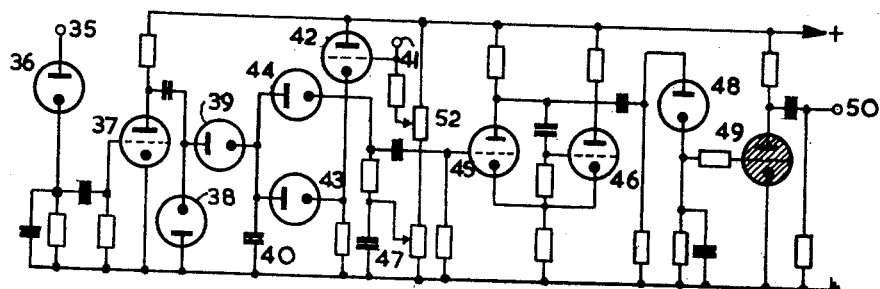
Fig. 4 is a schematic circuit diagram of part of the embodiment of Fig. 3.

The connection of the square-wave voltage generator 31 and of the stages 32 and 33 connected after it is shown more in detail in Fig. 4. The arrangement is chosen such that at the disappearance, or the sufficient reduction, of the reflection pulse corresponding to the slot between the work pieces a control takes place, so that the welding current is interrupted. This is the case, when the two plates mix their liquid metals during the operation at the welding area.

Figure 5:
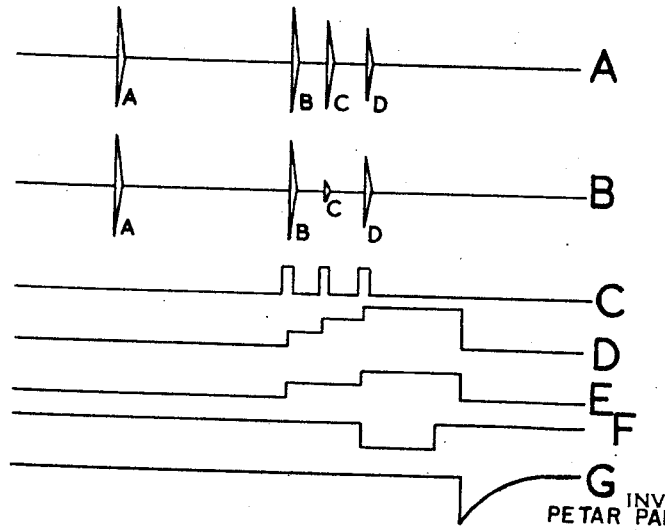
Fig. 5 is a graphical presentation of selected voltage waveforms of the embodiments of Figs. 3 and 5.

Figs. 5a and 5b show voltage diagrams indicating the ultrasonic sound pulses occurring during a pulse cycle period as a function of time; Fig. 5a illustrates the case in which, subsequent to the emission of the pulse A, three reflection pulses B, C and D are produced. The pulse B corresponds to a slot between the electrode 3 and the upper part of the work piece 4, pulse C corresponds to the slot between the two parts of the work piece and pulse D to the slot between the lower part of the work piece and the welding electrode 5. In general a short time after the reflection pulse D, a further reflection pulse will occur, which corresponds to the bottom end of the welding electrode 5, but this pulse is at a comparatively large distance from the pulse D and is not shown, since it is of no importance in the operation of the present arrangement. After the welding current has caused the metal of the work piece 4 to mix, the reflection pulse C disappears substantially completely and the voltage diagram shown in Fig. 5b is obtained.

The output voltage of the receiver 30 is supplied via the terminal 35 to the circuit arrangement shown in Fig. 4 and is rectified in a diode 36. In an amplifying tube 37 the rectified pulses are distorted by the control of said tube in such a manner that each time a narrow square-wave pulse with constant amplitude is produced; this is shown in Fig. 5c. These square-wave pulses excite a square-wave voltage generator comprising diodes 38, 39 and a capacitor 49. If, in accordance with Fig. 5a, three reflection pulses are produced, so that three square-wave pulses as shown in Fig. 5c occur, a square-wave voltage having three steps as shown in Fig. 5d is produced. At the termination of each period the square-wave voltage then obtained is reduced to the value zero with the aid of a pulse from the pulse generator 27; with respect to the transmitter pulse the latter pulse leads transiently and is supplied to a terminal 41. The pulse reaches the grid of a triode 42, which obtains a bias voltage from the potentiometer 52 such that a diode 43 connected to the cathode thereof is not conductive, as long as the square-wave voltage has not more than two steps. However, if at the termination of a period the pulse generator 27 supplies via the terminal 41 a negative blocking pulse of sufficient width to the grid of the triode 42, as is indicated in Fig. 5g, the voltage drop across the cathode resistor of the tube 42 disappears and hence also the bias voltage of the diode 43. Then the square-wave voltage capacitor 40 is discharged across the cathode resistor of the tube 42.

The capacitor 40 is connected furthermore via a second biassed diode 44 to a monostable trigger circuit, comprising electron tubes 45 and 46. If the square-wave voltage has three steps (Fig. 5d), a signal is produced at the trigger circuit 45, 46, if the bias voltage of the diode 44 is correctly adjusted, by means of a potentiometer 47. The potentiometer 47 is to be adjusted in a manner such that this takes place when a third step occurs in the square-wave voltage. The signal then supplied to the control-grid of the tube 45 causes the monostable multi-vibrator to change over. A negative pulse is then produced at the anode of the tube 45 and occurs across a diode 48 at the grid of an adjustable gas discharge tube 49. The grid circuit of this tube includes a resistor-capacitor circuit, the time constant of which is chosen to be such that the tube 49 does not ignite at a continuous occurrence of the negative pulse.

However, when the pulse C disappears, only two steps are obtained at the capacitor 40, as is shown in Fig. 5e. The multivibrator 45, 46 is not excited, since at only two steps the voltage across the capacitor 40 is not sufficiently high to render the diode 44 conductive. The negative charge of the grid of the tube 49 is not renewed, so that the tube 49 ignites as soon as the capacitor connected in its grid circuit has discharged sufficiently. At the ignition the anode of the tube 49 has produced at it a control-pulse (Fig. 5f), which is supplied via a terminal 50 to the switching device 34 of the welding transformer (shown in Fig. 3), which then switches off the welding current.

If the pressure of the welding electrodes 3 and 5 is not sufficiently high, no welding current can flow, since the discharge tube 49 is adjusted in such a manner that it continuously supplies blocking pulses, for example with a periodicity of 50 cycles per second. This is continued as long as only two reflection pulses occur. A distinct third reflection pulse C is produced only at the instant when the electrode pressure is sufficiently high to allow a sufficient penetration of the ultrasonic oscillations into the work piece 4. Then three pulses prevail for controlling the square-wave voltage generator; negative pulses are supplied to the grid of the tube 49, these pulses charge the capacitor of the grid-time constant device and then prevent the tube 49 from supplying blocking pulses via the terminal 50 to the switching member 34 (shown in Fig. 3). Thus the welding transformer 21 is switched on and the welding operation can start.

While the invention has been described by means of specific examples and in specific embodiments, I do not wish to be limited thereto, for obvious modifications will occur to those skilled in the art without departing from the spirit and scope of the invention.

What is claimed is:

1. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic vibrations at one end of said path, means arranged at the other end of said path for producing an electrical quantity having a value as determined by the intensity of the sonic vibrations at said other end of said path, means responsive to said electrical quantity at a first given value thereof for initiating the supply of welding current to said electrodes, and means responsive to said electrical quantity at a second given value thereof for terminating the supply of welding current to said electrodes.

2. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic vibrations at one end of said path, means arranged at the other end of said path for producing an electrical quantity having an amplitude value as determined by the sonic vibrations at said other end of said path, means for amplifying and demodulating said electrical quantity to produce a control signal, means responsive to said control signal at a first given value thereof for initiating the supply of welding current to said electrodes, and means responsive to said control signal at a second given value thereof for terminating the supply of welding current to said electrodes.

3. Electric welding apparatus as claimed in claim 2, wherein said second given value is greater in magnitude than said first given value.

4. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sinusoidally modulated sonic vibrations at one end of said path, means arranged at the other end of said path for providing an electrical quantity having an amplitude value as determined by the sonic vibrations at said other end of said path, means for amplifying and demodulating said electrical quantity, means for converting the output of said last-mentioned means to electrical pulses, means responsive to said electrical pulses at a first given value thereof for initiating the supply of welding current to said electrodes, and means responsive to said electrical pulses at a second given value thereof for terminating the supply of welding current to said electrodes.

5. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic vibrations to said workpiece through one of said electrodes, means arranged at said one of said electrodes for producing an electrical quantity having a value as determined by the intensity of the sonic vibrations reflected to said electrode by variations in said sonic path, means responsive to said electrical quantity at a first given value thereof for initiating the supply of welding current to said electrodes, and means responsive to said electrical quantity at a second given value thereof for terminating the supply of welding current to said electrodes.

6. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic vibrations in pulse form to said workpiece through one of said electrodes, means arranged at said workpiece for producing an electrical quantity having a value varying as the intensity of the sonic vibrations reflected to said electrodes by variations of said sonic path in said workpiece, means responsive both to the presence of a predetermined number of reflected vibrations in a single cycle and to said electrical quantity at a first given value thereof for initiating the supply of welding current to said electrodes, and means responsive to the presence of less than said predetermined number of reflected vibrations in said single cycle for terminating the supply of welding current to said electrodes.

7. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic pulses to said workpiece through one of said electrodes, means arranged at said workpiece for producing an electrical quantity having a value as determined by the number of pulses reflected to said electrodes by variations of said sonic path in said workpiece, said last-mentioned means comprising means for counting said reflected pulses and means for supplying said reflected pulses to said counting means, means responsive to the presence of a predetermined number of said reflected pulses in a single cycle as indicated by the value of said electrical quantity for initiating the supply of welding current to said electrodes, and means responsive to the presence of less than said predetermined number of said reflected pulses in said single cycle as indicated by the value of said electrical quantity for terminating the supply of welding current to said electrodes.

8. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic pulses to said workpiece through one of said electrodes, means arranged at said workpiece for producing an electrical quantity having a value as determined by the number of pulses reflected to said electrodes by variations of said sonic path in said workpiece, said last-mentioned means comprising square wave generating means for producing an output voltage increasing incrementally in magnitude for each reflected pulse supplied to it in a single pulse cycle independently of the magnitude of each said pulse and becoming zero in magnitude at the termination of said single pulse cycle and means for supplying said reflected pulses to said square wave generating means, means responsive to said output voltage at a first given magnitude thereof for initiating the supply of welding current to said electrodes, and means responsive to said output voltage at a second given magnitude thereof for terminating the supply of welding current to said electrodes.

9. Electric welding apparatus as claimed in claim 8, further comprising amplitude limiting means and means for supplying said reflected pulses through said amplitude limiting means to said square wave generating means.

10. Electric welding apparatus comprising welding electrodes adapted to engage a workpiece to effect a weld therein, said welding electrodes and said workpiece providing a path for sonic vibrations, said path having variations in sonic transmissivity as determined by the contact pressure between said welding electrodes and by the physical form of said workpiece while engaged by said electrodes, means for supplying welding current to said electrodes, means for supplying sonic pulses to said workpiece through one of said electrodes, means arranged at said workpiece for producing an electrical quantity having a value as determined by the number of pulses reflected to said electrodes by variations of said sonic path in said workpiece, said last-mentioned means comprising square wave generating means for producing an output voltage increasing incrementally in magnitude for each reflected pulse supplied to it in a single pulse cycle independently of the magnitude of each said pulse and becoming zero in magnitude at the termination of said single pulse cycle, means for supplying said reflected pulses to said square wave generating means, means for preventing said output voltage from initiating the supply of welding current to said electrodes until said output voltage reaches a magnitude indicating the presence of a predetermined number of reflected pulses, monostable multivibrator means for producing a negative output pulse, means for applying the output of said preventive means to the input of said multivibrator means, a gas discharge tube having a control electrode, means for applying the output of said multivibrator means to said control electrode, and a resistance-capacitance network connected to said control electrode having a time constant of a magnitude which prevents the ignition of said tube upon the continuous application of a negative pulse to said control electrode, means responsive to the extinguished condition of said tube for initiating the supply of welding current to said electrodes, and means responsive to the ignited condition of said tube for terminating the supply of welding current to said electrodes.

References Cited in the file of this patent

UNITED STATES PATENTS

| | | |
|---|---|---|
| 1,933,936 | Schnetzer | Nov. 7, 1933 |
| 1,967,094 | Lincoln | July 17, 1934 |
| 2,222,906 | Hentzen | Nov. 26, 1940 |
| 2,433,963 | Tarbox et al. | Jan. 6, 1948 |
| 2,433,964 | Tarbox et al. | Jan. 6, 1948 |